(12) United States Patent
Noritake et al.

(10) Patent No.: US 9,784,384 B2
(45) Date of Patent: Oct. 10, 2017

(54) DAMPER DEVICE

(71) Applicant: NIDEC SANKYO CORPORATION, Suwa-gun, Nagano (JP)

(72) Inventors: Seiichiro Noritake, Nagano (JP); Shunji Saito, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/168,744

(22) Filed: May 31, 2016

(65) Prior Publication Data
US 2016/0348806 A1    Dec. 1, 2016

(30) Foreign Application Priority Data
May 29, 2015   (JP) ................................. 2015-110820

(51) Int. Cl.
*F16K 31/04*   (2006.01)
*F16K 31/53*   (2006.01)
*F16K 1/20*    (2006.01)
*F25D 17/04*   (2006.01)

(52) U.S. Cl.
CPC .......... *F16K 31/535* (2013.01); *F16K 1/2007* (2013.01); *F16K 31/043* (2013.01); *F25D 17/045* (2013.01)

(58) Field of Classification Search
CPC ...... F16K 31/535; F16K 1/2007; F16K 31/53; F16K 31/041; F16K 31/043; F25D 17/045
USPC .... 251/250.5, 249, 248, 129.11–129.12, 298
See application file for complete search history.

(56) References Cited

U.S. PATENT DOCUMENTS

| 4,595,081 | A | * | 6/1986 | Parsons | F03G 1/08 251/129.11 |
| 4,669,578 | A | * | 6/1987 | Fukamachi | F03G 1/08 251/71 |
| 4,741,508 | A | * | 5/1988 | Fukamachi | F16K 31/043 251/129.12 |
| 5,986,369 | A | * | 11/1999 | Hanley | F16K 31/047 251/69 |
| 8,561,645 | B2 | * | 10/2013 | Leroux | F02M 26/06 251/250.5 |
| 2013/0047968 | A1 | * | 2/2013 | Hodebourg | F16K 11/22 251/248 |

FOREIGN PATENT DOCUMENTS

JP    2003240102 A    8/2003

* cited by examiner

*Primary Examiner* — John Bastianelli
(74) *Attorney, Agent, or Firm* — Cantor Colburn LLP

(57) ABSTRACT

A damper device may include a baffle to open/close an opening part; a motor; and a gear train connecting the motor and the baffle and including a partially toothless gear and a sector gear. The partially toothless gear may include an outer peripheral part so as to have an outer peripheral face curved along a tooth tip circle of the teeth part. The outer peripheral part may include an end face at a midway position of the teeth part in the axial line direction where a length in the axial line direction is shorter than a tooth width of the teeth part. The sector gear may include a first tooth cut out facing the outer peripheral face and configured to enter in to an inner peripheral side of the tooth tip circle. A second tooth disposed adjacent to the first tooth and configured to abut the outer peripheral face.

13 Claims, 8 Drawing Sheets

DAMPER DEVICE

CROSS REFERENCE TO RELATED APPLICATION

The present application claims priority under 35 U.S.C. §119 to Japanese Application No. 2015-110820 filed May 29, 2015, the entire content of which is incorporated herein by reference.

FIELD OF THE INVENTION

At least an embodiment of the present invention may relate to a damper device structured to open and close an opening part by a baffle.

BACKGROUND

A damper device structured to open and close an opening part structuring a part of a cold air passage of a refrigerator by a baffle is described in Japanese Patent Laid-Open No. 2003-240102. A baffle of the damper device described in the document is turned by a stepping motor and a drive mechanism including a gear train. The baffle is moved between a closed position closing an opening part and an open position opening the opening part. The gear train includes a partially toothless gear and a sector gear which is driven by the partially toothless gear.

The partially toothless gear is provided with an outer peripheral part having an outer peripheral face along a tooth tip circle of a teeth part at a portion adjacent to the teeth part in a circumferential direction. A length in an axial line direction of the outer peripheral part is shorter than a tooth width of the teeth part, and the outer peripheral part is provided with an end face facing one side (upper side) in the axial line direction at a midway position in the axial line direction of the teeth part. The sector gear is provided with a first tooth whose portion facing the outer peripheral face of the outer peripheral part of the partially toothless gear is cut out and capable of entering to an inner peripheral side of the tooth tip circle on one side (upper side) in the axial line direction of the end face of the outer peripheral part. Further, the sector gear is provided with a second tooth which is disposed at a position adjacent to the first tooth and is capable of abutting with the outer peripheral face of the outer peripheral part when the first tooth is entered to the inner peripheral side of the tooth tip circle. The sector gear is an output gear and is connected with the baffle.

In a state that the baffle is located at a closed position and the partially toothless gear is stopped, the first tooth of the sector gear is entered to the inner peripheral side of the tooth tip circle on one side in the axial line direction of the end face of the outer peripheral part. Further, the second tooth of the sector gear is abutted with the outer peripheral face of the outer peripheral part. In this case, when the second tooth is abutted with the outer peripheral part, the sector gear is prevented from turning in an opening direction of the baffle due to abutting with the outer peripheral part. Therefore, in the damper device described in Patent Literature described above, the baffle located at the closed position is prevented from moving to an open position.

FIG. 8A is a perspective view and FIG. 8B is a plan view showing a partially toothless gear and a sector gear which are capable of being utilized in the gear train of the baffle drive mechanism in the above-mentioned Patent Literature. In FIGS. 8A and 8B, a partially toothless gear 38 is provided with a circular arc-shaped outer peripheral part 52 having an outer peripheral face 52a having the same diameter and being concentric with a tooth tip circle 51a of a teeth part 51 at a portion adjacent to the teeth part 51 in a circumferential direction. In a sector gear 39, a tooth (first tooth 68) disposed at one end in a circumferential direction is provided with a cut-out part in a portion which faces the outer peripheral face 52a of the circular arc-shaped outer peripheral part 52 of the partially toothless gear 38.

FIGS. 8A and 8B show states that a baffle is located at a closed position and the partially toothless gear 38 is stopped. In this state, a first tooth 68 of the sector gear 39 is entered to an inner peripheral side of the tooth tip circle 51a on one side (upper side) of an end face 52b of the circular arc-shaped outer peripheral part 52 in a turning center axial line "L1" direction of the partially toothless gear 38. Further, a second tooth 69 of the sector gear 39 is abutted with an outer peripheral face 52a of the circular arc-shaped outer peripheral part 52. In this manner, the sector gear 39 is prevented from turning in a first turning direction "B1" (turning direction of the baffle for opening).

When the baffle located at the closed position is to be moved to an open position, the partially toothless gear 38 is turned in a first turning direction "A1" by driving a stepping motor. Therefore, when the partially toothless gear 38 starts turning, the tooth 53 (tooth on a front end in the first turning direction "A1") disposed on the most circular arc-shaped outer peripheral part 52 side of the partially toothless gear 38 is passed through the second tooth 69 of the sector gear abutted with the outer peripheral face 52a of the circular arc-shaped outer peripheral part 52 and is engaged with the first tooth 68.

In this example, as shown in FIGS. 8A and 8B, when the turning center axial line "L2" of the sector gear 39 is inclined due to force acted on the sector gear 39 by the baffle, component tolerances and the like, an end 69c on one side (upper side) in the axial line "L1" direction of the second tooth 69 of the sector gear 39 in the abutted state with the outer peripheral face 52a of the circular arc-shaped outer peripheral part 52 may be entered to an inner peripheral side of the tooth tip circle 51a of the partially toothless gear 38 on the one side in the axial line "L1" direction on the end face 52b of the circular arc-shaped outer peripheral part 52. In this case, when the tooth 53 of the partially toothless gear 38 is going to pass through the second tooth 69 of the sector gear, the tooth 53 of the partially toothless gear 38 and the second tooth 69 are interfered with each other to generate abnormal noise.

SUMMARY

In view of the problem described above, at least an embodiment of the present invention may advantageously provide a damper device which is capable of preventing or restraining interference of the sector gear with the partially toothless gear and generation of abnormal noise when engagement of the sector gear with the partially toothless gear is started even if the turning center axial line of the sector gear is inclined.

According to at least an embodiment of the present invention, there may be provided a damper device including a baffle configured to open and close an opening part, a motor, and a gear train structured to transmit rotation of the motor to the baffle. The gear train includes a partially toothless gear and a sector gear configured to engage with the partially toothless gear and driven by the partially toothless gear. The partially toothless gear is provided with an outer peripheral part at a portion adjacent to a teeth part in a circumferential direction so as to have an outer peripheral face curved along a tooth tip circle of the teeth part on an outer peripheral side relative to the tooth tip circle. The outer peripheral part is provided with an end face directed to one side in an axial line direction at a midway position of the teeth part in the axial line direction where a length in the axial line direction is shorter than a tooth width of the teeth part. The sector gear includes a first tooth which is cut out at a portion facing the outer peripheral face and is capable of entering to an inner peripheral side of the tooth tip circle on the one side in the axial line direction of the end face, and a second tooth which is disposed so as to be adjacent to the first tooth and is capable of abutting with the outer peripheral face when the first tooth is entered to the inner peripheral side of the tooth tip circle.

According to at least an embodiment of the present invention, when the first tooth of the sector gear is entered to an inner peripheral side of the tooth tip circle on the one side in the axial line direction of the end face of the outer peripheral part of the partially toothless gear, the second tooth of the sector gear is abutted with the outer peripheral face of the outer peripheral part and turning of the sector gear is restricted. Therefore, for example, when the baffle is located at a closed position where the baffle closes the opening part, the first tooth is entered to the inner peripheral side of the tooth tip circle of the partially toothless gear and the second tooth is abutted with the outer peripheral face of the outer peripheral part and, as a result, the sector gear is prevented from turning in a direction in which the baffle opens the opening part. In this case, the outer peripheral face of the outer peripheral part with which the second tooth is abutted is located on an outer peripheral side relative to the tooth tip circle of the teeth part. Specifically, when the first tooth is entered to the inner peripheral side of the tooth tip circle, the second tooth is abutted with the outer peripheral face at a position on an outer peripheral side relative to the tooth tip circle. Therefore, even when a turning center axial line of the sector gear is inclined, one end portion (upper end) in an axial line direction of the second tooth in a state that the second tooth is abutted with the outer peripheral face of the outer peripheral part is prevented or restrained from entering to the inner peripheral side of the tooth tip circle on one side in the axial line direction of the end face of the outer peripheral part. Accordingly, after the partially toothless gear starts to turn, the tooth disposed on the most outer peripheral part side of the partially toothless gear is going to engage with a portion of the sector gear between the first tooth and the second tooth, the tooth of the partially toothless gear and the second tooth are prevented or restrained from interfering with each other and thus abnormal noise is prevented or restrained from being generated. In this case, the partially toothless gear may be structured so that the partially toothless gear is integrally provided with the large diameter gear on the one side in the axial line direction of the large diameter gear to which rotation of the motor is transmitted.

In at least an embodiment of the present invention, the outer peripheral face of the outer peripheral part is continuously connected with a first tooth face located on an opposite side to the outer peripheral part of a tooth on the most outer peripheral part side of the teeth part without a step through a curved face. According to this structure, when the second tooth contacted with the first tooth face is to be contacted with the outer peripheral face of the outer peripheral part or, when the second tooth contacted with the outer peripheral face of the outer peripheral part is to be contacted with the first tooth face, abnormal noise is prevented or restrained from being generated.

In this case, it may be structured that the sector gear is provided with an output shaft which is coaxially protruded to one side or the other side in the axial line direction, and the baffle is connected with the output shaft. Further, in this case, it may be structured that the damper device includes a case which accommodates the motor and the gear train structured to transmit rotation of the motor to the baffle, and the sector gear includes a shaft part, the output shaft, a column part provided between the shaft part and the output shaft, and a circular arc part provided with a plurality of teeth including the first tooth and the second tooth along its outer peripheral face on an outer peripheral side of the column part. The case is provided with a tube part into which the shaft part is inserted for turnably supporting the sector gear, and the output shaft is connected with the baffle and the shaft part is inserted into the tube part and thereby the sector gear is held turnably. According to this structure, even when a turning center axial line of the sector gear is easily inclined due to a structure that the output shaft of the sector gear is connected with the baffle and the shaft part of the sector gear is inserted into the tube part to turnably hold the sector gear, an end portion of the second tooth in a state that the second tooth is abutted with the outer peripheral face of the outer peripheral part is prevented or restrained from entering to the inner peripheral side of the tooth tip circle. Therefore, the tooth of the partially toothless gear and the second tooth are prevented or restrained from interfering with each other and thus abnormal noise is prevented or restrained from being generated.

In at least an embodiment of the present invention, when the baffle is located at a closed position where the opening part is closed, the first tooth is entered to the inner peripheral side of the tooth tip circle on one side in the axial line direction of the end face of the outer peripheral part, and the second tooth is abutted with the outer peripheral face to prevent the sector gear from turning in an opening direction of the baffle. According to this structure, the baffle located at the closed position is restrained from being flapped due to fluid pressure. When a stepping motor is used as the motor, in order to surely close the opening part by the baffle, the motor may be further driven by a plurality of steps after the baffle is located at the closed position. In such a case, the baffle is easily flapped due to the step-out occurred in the stepping motor. In order to prevent this problem, when the baffle is located at the closed position, the sector gear is prevented from turning in an opening direction of the baffle and, as a result, the flapping is restrained.

In at least an embodiment of the present invention, the damper device includes a frame provided with the opening part, and the baffle includes an elastic member which is capable of closing the opening part, and the elastic member is abutted with an opening edge of the opening part of the frame and is elastically deformed when the baffle is located at the closed position. According to this structure, the opening part can be surely closed by the baffle. Shape restoring force of the elastic member which is elastically deformed is acted on the sector gear as force for turning the sector gear in an opening direction of the baffle. However, when the baffle is located at the closed position, the sector gear is prevented from turning in an opening direction of the baffle. Therefore, the baffle is not moved from the closed position in a direction for opening the opening part due to the shape restoring force of the elastic member. Further, when the shape restoring force of the elastic member is transmitted to the sector gear through the baffle and the output shaft, a turning center axial line of the sector gear may be inclined. However, also in this case, one end portion in the axial line direction of the second tooth in a state that the second tooth is abutted with the outer peripheral face of the outer peripheral part is prevented or restrained from entering to the inner peripheral side of the tooth tip circle on the one side in the axial line direction of the end face of the outer peripheral part. Therefore, the tooth of the partially toothless gear and the second tooth are prevented or restrained from interfering with each other and thus abnormal noise is prevented or restrained from being generated. Specifically, the baffle includes an opening and closing plate provided with a flat plate part which is larger than the opening part, and the elastic member which is stuck on a face on an opening part side of the flat plate part. When the baffle is located at the closed position where the baffle closes the opening part, the sector gear is prevented from turning in an opening direction of the baffle by the second tooth abutted with the outer peripheral face against shape restoring force of the elastic member which is elastically deformed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A damper device for a refrigerator to which at least an embodiment of the present invention is applied will be described below with reference to the accompanying drawings.

(Entire Structure)

Figure 1A:
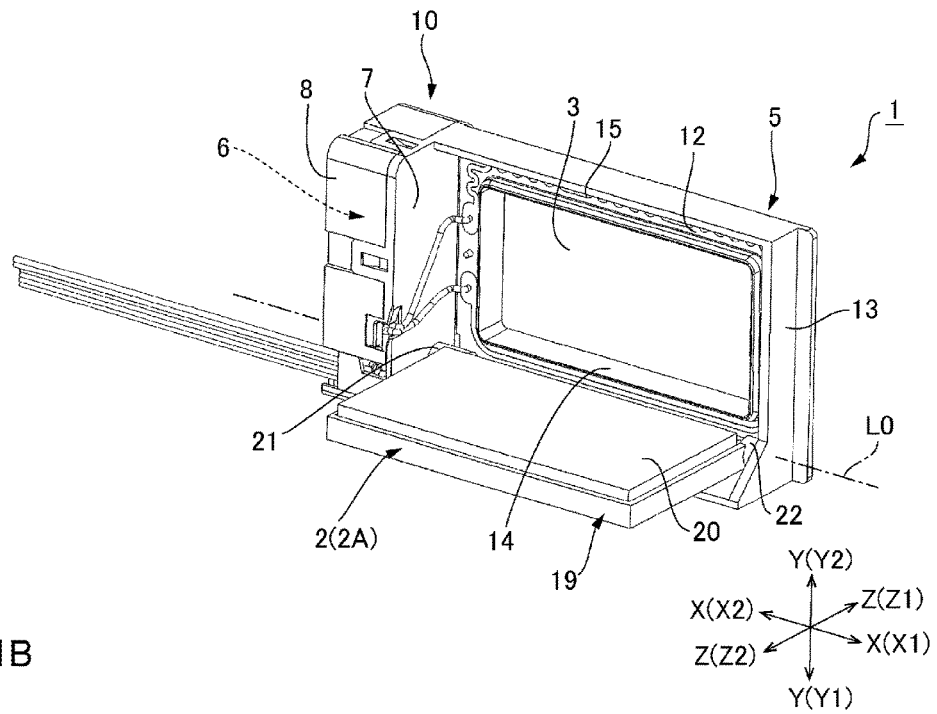
FIGS. 1A and 1B are perspective views showing a damper device in accordance with an embodiment of the present invention.
Figure 1B:
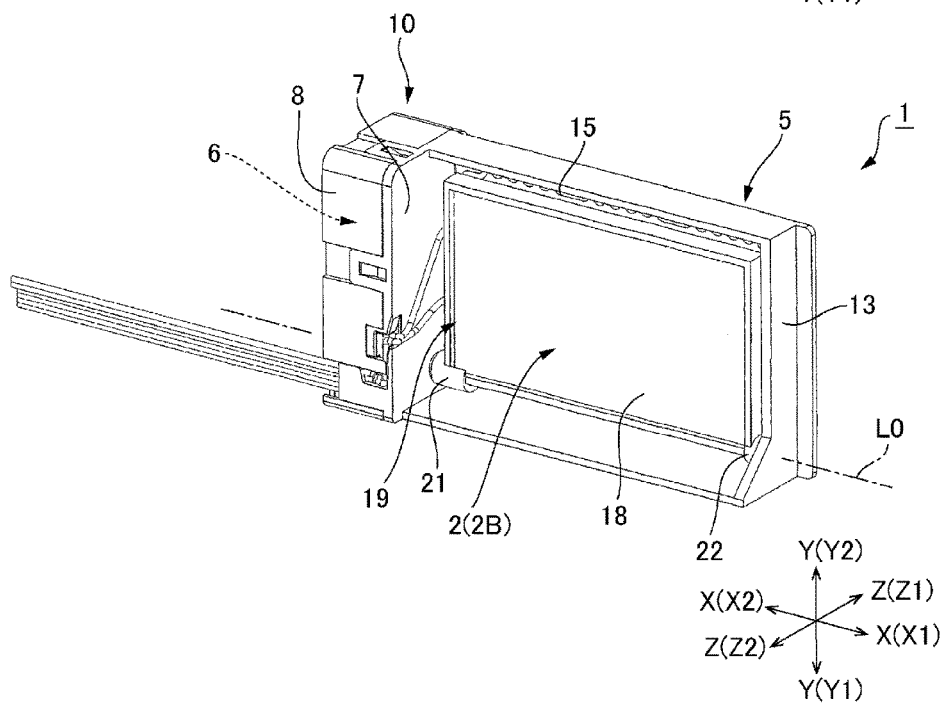
Figure 2:
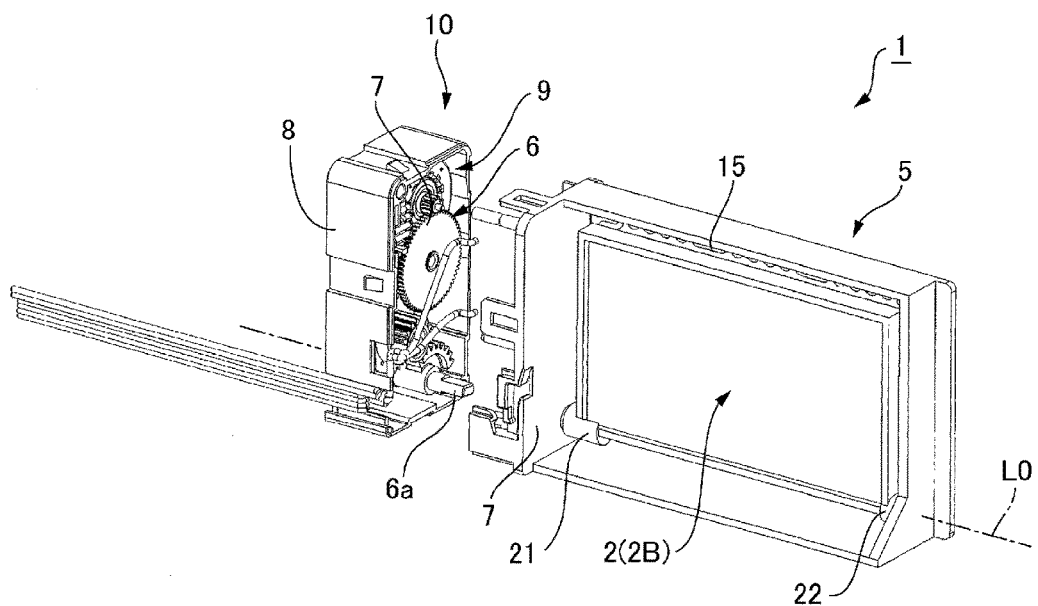
FIG. 2 is an exploded perspective view showing a damper device in accordance with an embodiment of the present invention.
Figure 2:
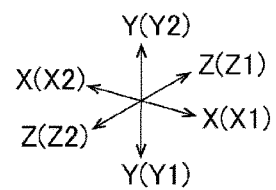

FIGS. 1A and 1B are perspective views showing a damper device to which at least an embodiment of the present invention is applied and which is viewed from a side where a baffle is disposed. FIG. 1A is a perspective view showing a state that an opening part is opened and FIG. 1B is a perspective view showing a state that the opening part is closed. FIG. 2 is an exploded perspective view showing a damper device in FIG. 1. In the following descriptions, a turning center axial line of a baffle 2 in a damper device 1 is set as an "L0", a direction along the turning center axial line "L0" is referred to as an "X" direction, a direction which is perpendicular to the "X" direction and in which an opening part 3 to be opened and closed by the baffle 2 is directed is referred to as a "Z" direction, and a direction perpendicular to the "X" direction and the "Z" direction are referred to as a "Y" direction. Further, one side in the "X" direction is referred to as an "X1", the other side in the "X" direction is referred to as an "X2", one side in the "Y" direction is referred to as a "Y1", the other side in the "Y" direction is as a "Y2", one side in the "Z" direction is referred to as a "Z1", and the other side in the "Z" direction is as a "Z2".

As shown in FIG. 1A, the damper device 1 includes a frame 5 provided with a rectangular opening part 3 which is opened in the "Z" direction and a baffle 2 configured to open and close the opening part 3 of the frame 5. Further, the damper device 1 includes, as shown in FIG. 2, a baffle drive mechanism 6 structured to drive the baffle 2. The baffle drive mechanism 6 is accommodated in a drive chamber 9 which is formed by a cover 7 integrally provided with the frame 5 on one side "X1" in the "X" direction of the frame 5 and a case 8 which covers the cover 7 from one side "X1" in the "X" direction. The case 8, the cover 7 and the baffle drive mechanism 6 structure a geared motor 10. The frame 5, the cover 7 and the case 8 are made of resin.

The frame 5 is, as shown in FIG. 1A, provided with a rectangular end plate part 12 in which the opening part 3 is formed, and a body part 13 in a rectangular tube shape which is protruded to the other side "Z2" in the "Z" direction from an outer side edge of the end plate part 12. The cover 7 is integrally provided with the body part 13 on the other side "X2" in the "X" direction of the body part 13. A seal plate part 14 in a rectangular tube shape which is protruded toward the baffle 2 side is provided at an edge of the opening part 3 in the end plate part 12.

A state that the baffle 2 is located at an open position 2A where the opening part 3 is opened is a state shown in FIG. 1A, and the baffle 2 is set in a posture perpendicular to the end plate part 12. A state that the baffle 2 is located at a closed position 2B where the opening part 3 is closed is a state shown in FIG. 1B, and the baffle 2 is set in a posture extended in parallel to the end plate part 12. The baffle 2 is turned over an angular range of 90° between the closed position 2B and the open position 2A.

The baffle 2 is abutted with the seal plate part 14 from the other side "Z2" in the "Z" direction and the opening part 3 is set in a closed state. A face of the end plate part 12 on a side where the baffle 2 is disposed is attached with a heater 15 in a state surrounding the opening part 3 (seal plate part 14).

The baffle 2 includes an opening/closing (opening and closing) plate 19 provided with a rectangular flat plate part 18 larger than the opening part 3, and a rectangular elastic member 20 stuck on a face of the flat plate part 18 on a side of the opening part 3. The elastic member 20 is formed in a sheet shape and is made of foamed polyurethane or the like. When the baffle 2 is located at the closed position 2B, the elastic member 20 is abutted with the seal plate part 14 and is elastically deformed.

The baffle 2 is provided with a first shaft part 21, into which an output shaft 6a of the baffle drive mechanism 6 (see FIG. 2) is inserted, in an end portion on the other side "X2" in the "X" direction and in an end portion on one side "Y1" in the "Y" direction. In addition, the baffle 2 is provided with a second shaft part 22 which is turnably supported by the body part 13 in an end portion on one side "X1" in the "X" direction and in an end portion on one side "Y1" in the "Y" direction. When the baffle drive mechanism 6 is driven, the baffle 2 is turned around the turning center axial line "L0", which is coaxial with the first shaft part 21 and the second shaft part 22, and the opening part 3 is opened and closed.

The damper device 1 is disposed on an inner side of a duct structuring a cold air passage of a refrigerator. Cold air passes and flows through the opening part 3 from an opposite side to a side where the baffle 2 is disposed with respect to the opening part 3. Alternatively, cold air passes and flows through the opening part 3 from a side where the baffle 2 is disposed with respect to the opening part 3.

(Geared Motor)

Figure 3A:
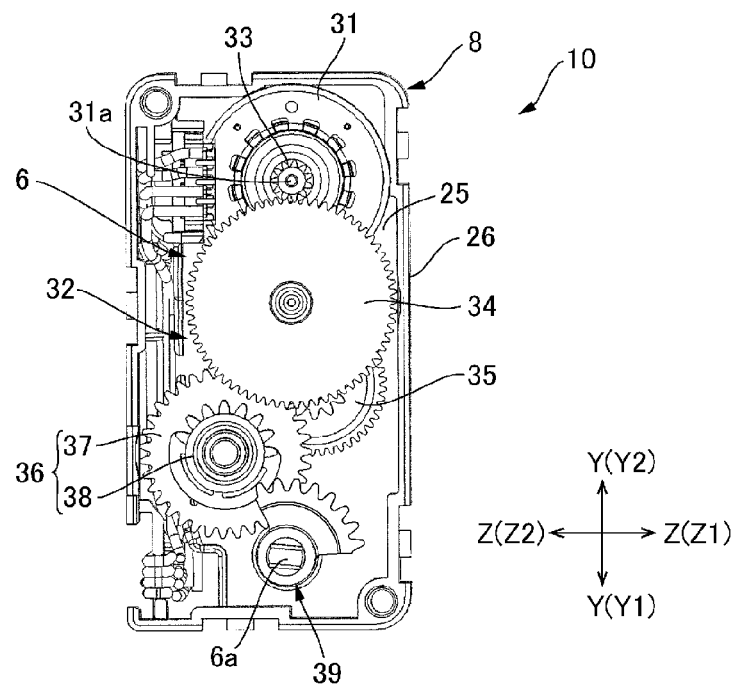
FIGS. 3A and 3B are a plan view and an exploded perspective view showing a geared motor from which a cover is detached.
Figure 3B:
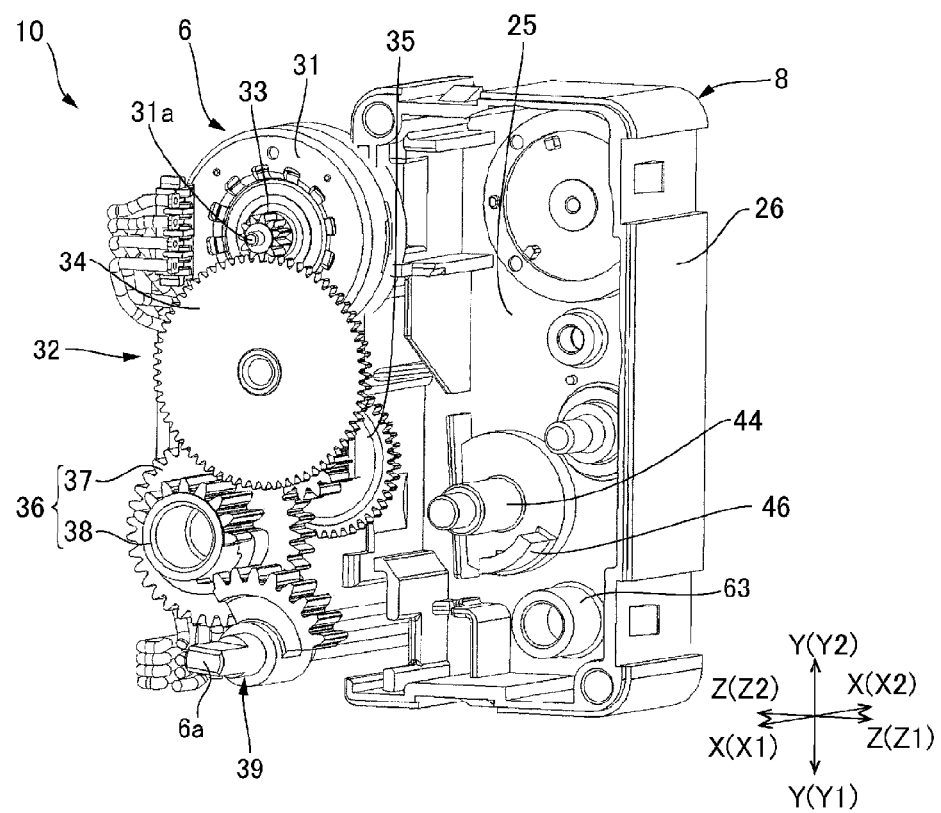

FIGS. 3A and 3B are explanatory views showing the geared motor 10 from which the cover 7 is detached. FIG. 3A is a plan view showing the geared motor 10 which is viewed from one side "X1" in the "X" direction, and FIG. 3B is an exploded perspective view showing the geared motor 10. The case 8 of the geared motor 10 is provided with a bottom plate part 25 enlarged along the "Y" direction and the "Z" direction and a case body part 26 in a rectangular tube shape which is protruded to a cover 7 side (one side "X1" in the "X" direction) from the bottom plate part 25.

The baffle drive mechanism 6 is accommodated in the case 8. The baffle drive mechanism 6 includes a motor 31 and a gear train 32 structured to transmit rotation of the motor 31 to the baffle 2. The motor 31 is a stepping motor and is set in a posture so that its output shaft 31a is directed to one side "X1" in the "X" direction. A pinion 33 is attached to the output shaft 31a of the motor 31.

The gear train 32 includes the pinion 33, a first gear 34 provided with a large diameter gear engaged with the pinion 33, a second gear 35 provided with a large diameter gear engaged with a small diameter gear (not shown) of the first gear 34, and a drive gear 36 engaged with a small diameter gear of the second gear 35. In the gear train 32, the first gear 34, the second gear 35 and the drive gear 36 structure a reduction gear train. The drive gear 36 is provided with a large diameter gear 37 engaged with the small diameter gear of the second gear 35 and a partially toothless gear 38 which is integrally and concentrically formed with the large diameter gear 37 on one side "X1" in the "X" direction of the large diameter gear 37.

The gear train 32 includes a sector gear 39 which is engaged with the partially toothless gear 38 of the drive gear 36 and is driven by the drive gear 36. The sector gear 39 is a final gear (output gear) located at the final stage of the gear train 32 and is provided with the output shaft 6a which is connected with the baffle 2. The first gear 34, the second gear 35, the drive gear 36 and the sector gear 39 are respectively turnably supported by the bottom plate part 25 of the case 8 with their turning center axial lines directed in the "X" direction. Each of the gears structuring the gear train 32 is a resin molded product.

(Drive Gear)

Figure 4A:
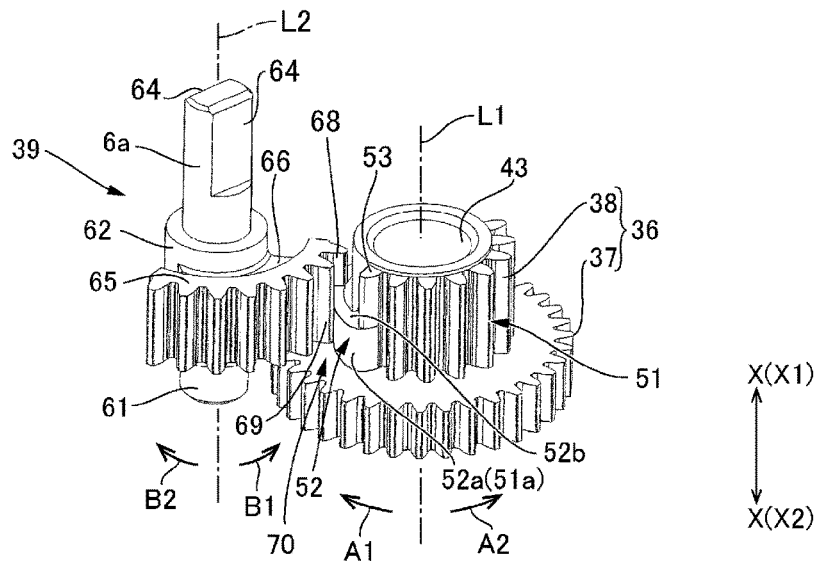
FIGS. 4A, 4B and 4C are perspective views and a plan view showing a partially toothless gear and a sector gear.
Figure 4B:
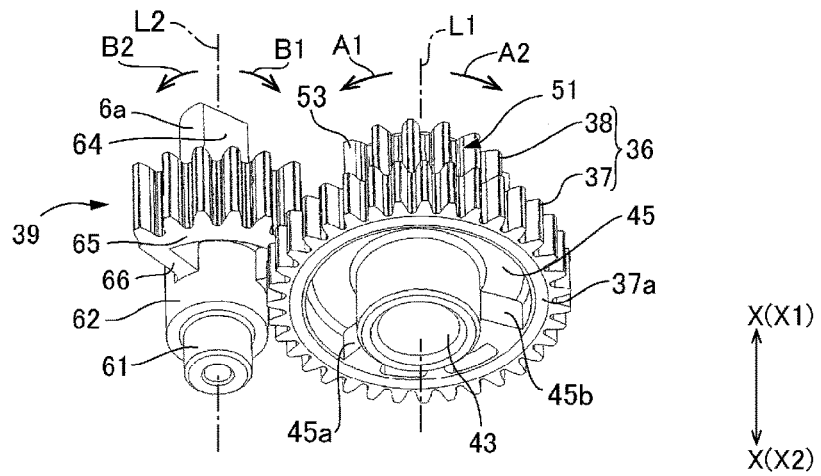
Figure 4C:
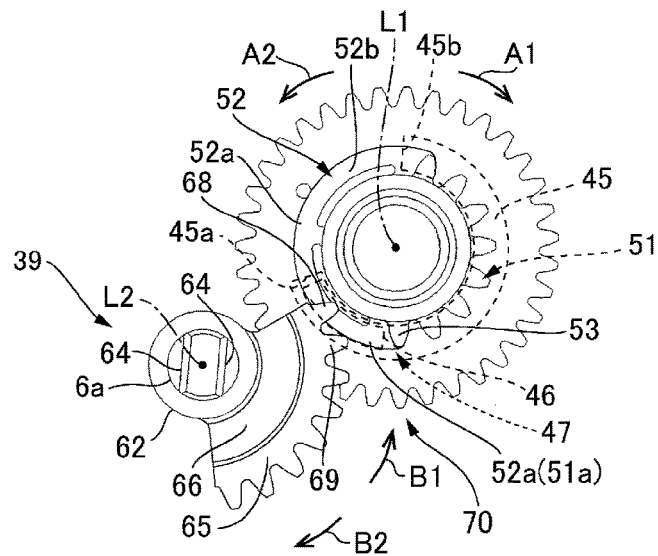
Figure 5A:
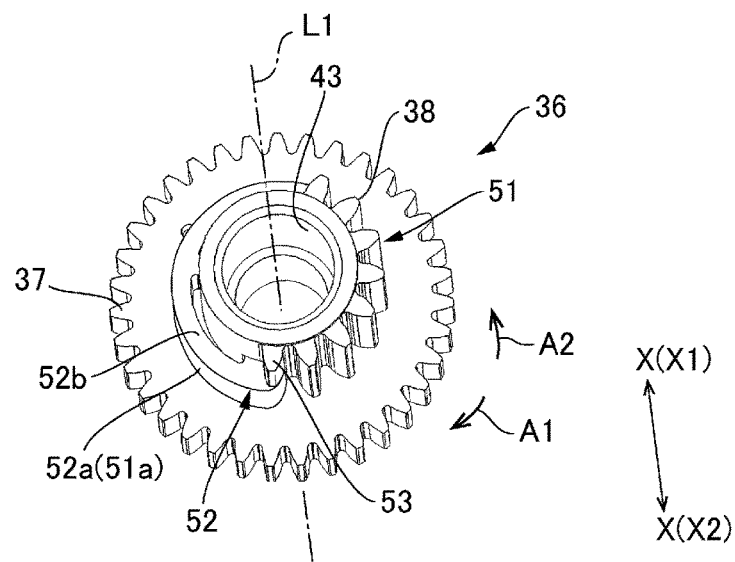
FIGS. 5A and 5B are a perspective view showing a partially toothless gear and a perspective view showing a sector gear.
Figure 5B:
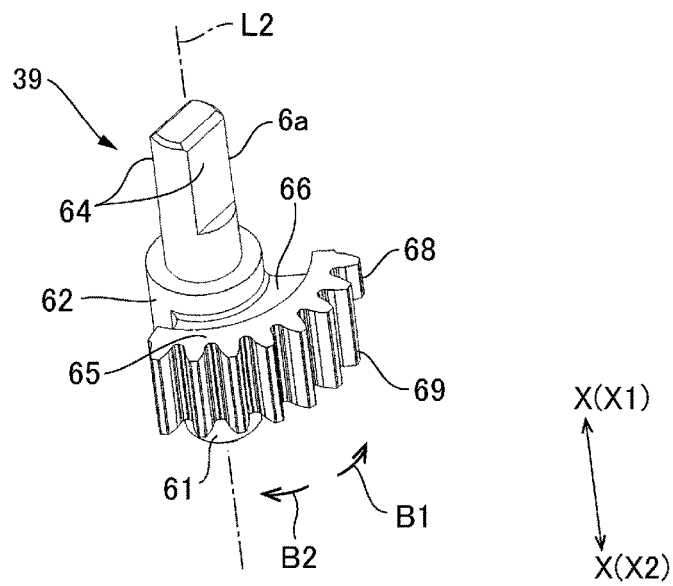
Figure 6:
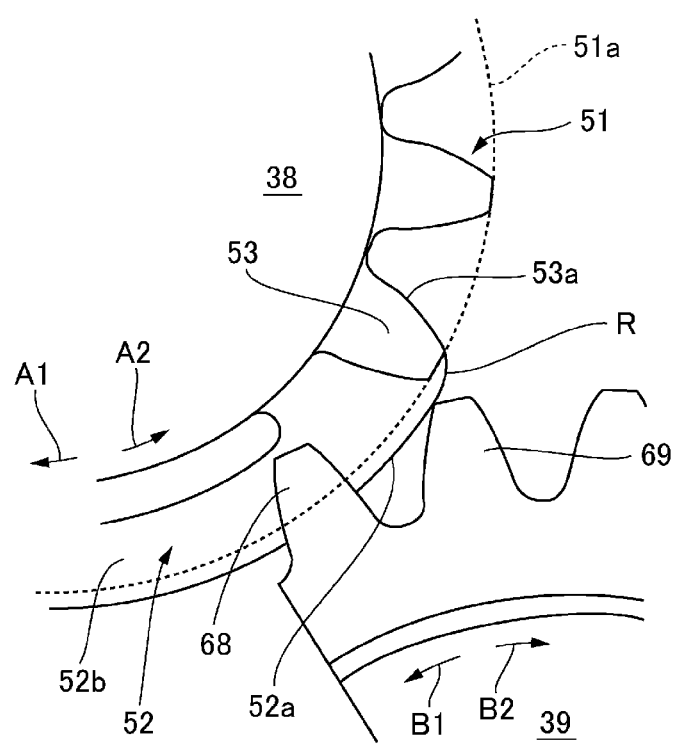
FIG. 6 is an explanatory view showing a shape of a connected portion of a teeth part with a circular arc-shaped outer peripheral part of a partially toothless gear.

FIG. 4A is a perspective view showing the drive gear 36 and the sector gear 39 which are viewed from a side of the partially toothless gear 38 of the drive gear 36, FIG. 4B is a perspective view showing the drive gear 36 and the sector gear 39 which are viewed from a side of the large diameter gear 37 of the drive gear 36, and FIG. 4C is a plan view showing the drive gear 36 and the sector gear 39 which are viewed from a side of the partially toothless gear 38. FIG. 5A is a perspective view showing the drive gear 36 and FIG. 5B is a perspective view showing the sector gear 39. FIG. 6 is an explanatory view showing a shape of a connected portion of a teeth part with a circular arc-shaped outer peripheral part of the partially toothless gear 38.

As shown in FIGS. 4A, 4B and 4C and FIG. 5A, the drive gear 36 is provided with the large diameter gear 37 formed of a spur gear and the partially toothless gear 38 having a smaller diameter than the large diameter gear 37 from the other side "X2" to one side "X1" in the "X" direction in this order. The drive gear 36 is structured of the large diameter gear 37 and the partially toothless gear 38. Further, the drive gear 36 is provided with a shaft hole 43 which is extended so as to penetrate through the large diameter gear 37 and the partially toothless gear 38. A support shaft 44 (see FIG. 3B) which is protruded from the bottom plate part 25 of the case 8 to one side "X1" in the "X" direction is inserted into the shaft hole 43. Therefore, the drive gear 36 is turnable around an axial line "L1" of the support shaft 44 (around an axial line "L1" of the shaft hole 43). The axial line "L1" of the support shaft 44 is the turning center axial line "L1" of the drive gear 36.

As shown in FIG. 4B, an end face 37a of the large diameter gear 37 on the other side "X2" in the "X" direction facing the bottom plate part 25 is formed with a circular arc groove 45 having a constant width around the shaft hole 43 over a predetermined angular range so as to be concentric with the shaft hole 43. The circular arc groove 45 is inserted with a circular arc-shaped protruded part 46 (see FIG. 3B) which is formed on the bottom plate part 25 of the case 8 so as to be concentric with the support shaft 44 and protruded to one side "X1" in the "X" direction. Therefore, turning of the drive gear 36 is permitted between a position where the circular arc-shaped protruded part 46 is abutted with one inner peripheral end face 45a in a circumferential direction of an inner peripheral face of the circular arc groove 45 and a position where the circular arc-shaped protruded part 46 is abutted with the other inner peripheral end face 45b. In other words, the circular arc groove 45 of the large diameter gear 37 and the circular arc-shaped protruded part 46 of the case 8 structure a turning angle range restriction mechanism 47 which restricts a turning angle range of the drive gear 36.

A first turning direction "A1" of the drive gear 36 shown by the arrow "A1" in FIGS. 4A, 4B and 4C is a turning direction for turning the baffle 2 in an opening direction (FIG. 4A shows the closed state of the baffle 2). The sector gear 39 which is driven by the drive gear 36 is turned in a first turning direction "B1" as shown by the arrow "B1" in FIGS. 4A, 4B and 4C when the drive gear 36 is turned in the first turning direction "A1" in order to set in an opened state from a closed state of the baffle 2. On the other hand, a second turning direction "A2" of the drive gear 36 as shown by the arrow "A2" in FIGS. 4A, 4B and 4C is a turning direction for turning the baffle 2 in a closing direction. The sector gear 39 which is driven by the drive gear 36 is turned in a second turning direction "B2" as shown by the arrow "B2" in FIGS. 4A, 4B and 4C when the drive gear 36 is turned in the second turning direction "A2". In a state that the baffle 2 is located at the closed position "2B", as shown in FIG. 4C, the inner peripheral end face 45a on one side of the circular arc groove 45 of the large diameter gear 37 and the circular arc-shaped protruded part 46 of the case 8 are abutted with each other. Therefore, the drive gear 36 is prevented from being further turned in the second turning direction "A2" (turning direction for closing the baffle) by the turning angle range restriction mechanism 47.

The partially toothless gear 38 is, as shown in FIG. 4C and FIG. 5A, provided with a teeth part 51 over a predetermined angular range which is narrower than 180°. Further, the partially toothless gear 38 is provided with a circular arc-shaped outer peripheral part (outer peripheral part) 52 having an outer peripheral face 52a which is disposed to an outer peripheral side of a tooth tip circle 51a of the teeth part 51 and is curved along the tooth tip circle 51a at a portion adjacent to the teeth part 51 in a circumferential direction. The circular arc-shaped outer peripheral part 52 is protruded along the "X" direction from an end face on one side "X1" in the "X" direction of the large diameter gear 37 along the turning center axial line "L1" of the drive gear 36. Further, a length in the "X" direction of the circular arc-shaped outer peripheral part 52 is shorter than a tooth width of the teeth part 51 (length in the "X" direction of the teeth part 51), and the circular arc-shaped outer peripheral part 52 is provided with an end face 52b which is directed to one side "X1" in the "X" direction (one side in the turning center axial line "L1" direction) at a midway position in the "X" direction of the teeth part 51. In other words, the end face 52b is a flat face perpendicular to the turning center axial line "L1".

In this embodiment, the outer peripheral face 52a of the circular arc-shaped outer peripheral part 52 is a circular arc face which is concentric with the tooth tip circle 51a of the teeth part 51 and has a larger diameter than the tooth tip circle 51a. As shown in FIG. 6, the outer peripheral face 52a of the circular arc-shaped outer peripheral part 52 is continuously connected through a curved face "R" without a step with a first tooth face 53a (tooth face on an opposite side to the circular arc-shaped outer peripheral part 52) of a first tooth 53 on the most circular arc-shaped outer peripheral part 52 side of the teeth part 51. The first tooth face 53a is a tooth face of the first tooth 53 located on a side facing the next tooth to the first tooth 53.

(Sector Gear)

As shown in FIGS. 4A, 4B and 4C and FIG. 5B, the sector gear 39 is provided with a shaft part 61, the output shaft 6a, and a column part 62 between the shaft part 61 and the output shaft 6a. The shaft part 61 is disposed at an end on the other side "X2" in the "X" direction of the sector gear 39. The bottom plate part 25 of the case 8 is provided with a tube part 63 (see FIG. 3B) which is protruded to one side "X1" in the "X" direction and the shaft part 61 is inserted into the tube part 63. Therefore, the sector gear 39 is turnable around an axial line "L2" of the tube part 63 (around the axial line "L2" of the shaft part 61). The axial line "L2" of the tube part 63 is the turning center axial line "L2" of the sector gear 39.

The output shaft 6a is the output shaft 6a of the baffle drive mechanism 6. An outer peripheral face of the output shaft 6a is formed with flat face parts 64 parallel to each other on both sides interposing the turning center axial line "L2". The first shaft part 21 of the baffle 2 is formed with a recessed part on an end face on the other side "X2" in the "X" direction to which the output shaft 6a is fitted. The output shaft 6a is fitted to the recessed part and thereby turning of the output shaft 6a can be transmitted to the baffle 2. The column part 62 is coaxial with the shaft part 61 and the output shaft 6a and its outer diameter is larger than an outer diameter of the shaft part 61 and an outer diameter of the output shaft 6a.

The sector gear 39 is provided with a circular arc part 65 having a plurality of teeth along its outer peripheral face on an outer peripheral side of the column part 62. A connecting part 66 is provided between the column part 62 and the circular arc part 65 for connecting the column part 62 with the circular arc part 65.

In a plurality of teeth arranged in a circumferential direction of the sector gear 39, a first tooth 68 which is located at a front end in the first turning direction "B1" (turning direction for opening the baffle) is, as shown in FIG. 5B, cut out in a portion which faces the outer peripheral face 52a of the circular arc-shaped outer peripheral part 52 of the partially toothless gear 38. As a result, as shown in FIG. 4A and FIG. 4C, the first tooth 68 is capable of entering to an inner peripheral side of the tooth tip circle 51a of the partially toothless gear 38 on one side "X1" in the "X" direction of the end face 52b of the circular arc-shaped outer peripheral part 52 (one side in the turning center axial line "L1" direction of the end face 52b). In the plurality of the teeth formed in the circumferential direction of the sector gear 39, other teeth except the first tooth 68 (second tooth 69 and a plurality of the remaining teeth disposed on an opposite side to the first tooth 68 with respect to the second tooth 69) are provided with the same tooth width as each other in the teeth part 51 of the partially toothless gear 38.

In this embodiment, as shown in FIG. 4, when the first tooth 68 of the sector gear 39 is entered to an inner peripheral side of the tooth tip circle 51a on one side "X1" in the "X" direction of the end face 52b of the circular arc-shaped outer peripheral part 52 of the partially toothless gear 38, the second tooth 69 of the sector gear 39 is abutted with the outer peripheral face 52a of the circular arc-shaped outer peripheral part 52 and thereby turning of the sector gear 39 is restricted. In other words, the circular arc-shaped outer peripheral part 52 of the partially toothless gear 38 and the first tooth 68 and the second tooth 69 of the sector gear 39 structure a turning restriction mechanism 70 which restricts turning in a particular direction of the sector gear 39. In this embodiment, after the drive gear 36 is turned in the second turning direction "A2" for closing by the baffle 2, when the drive gear 36 is stopped at a restriction position where turning in the second turning direction "A2" is restricted by the turning angle range restriction mechanism 47, the first tooth 68 of the sector gear 39 is entered to an inner peripheral side of the tooth tip circle 51a on one side "X1" in the "X" direction of the circular arc-shaped outer peripheral part 52. As a result, the second tooth 69 of the sector gear 39 is abutted with the outer peripheral face 52a of the circular arc-shaped outer peripheral part 52 located on the outer peripheral side relative to the tooth tip circle 51a, and the sector gear 39 is restricted from turning in the first turning direction "B1" for opening the baffle 2.

(Opening and Closing Operations for Opening Part by Damper Device)

Figure 7A:
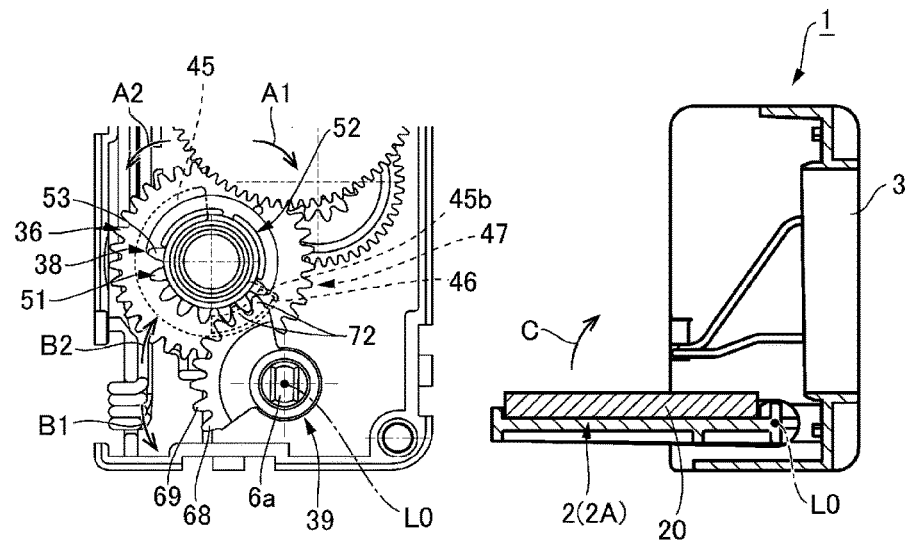
FIGS. 7A and 7B are explanatory views showing opening and closing operations for an opening part by a damper device.
Figure 7B:
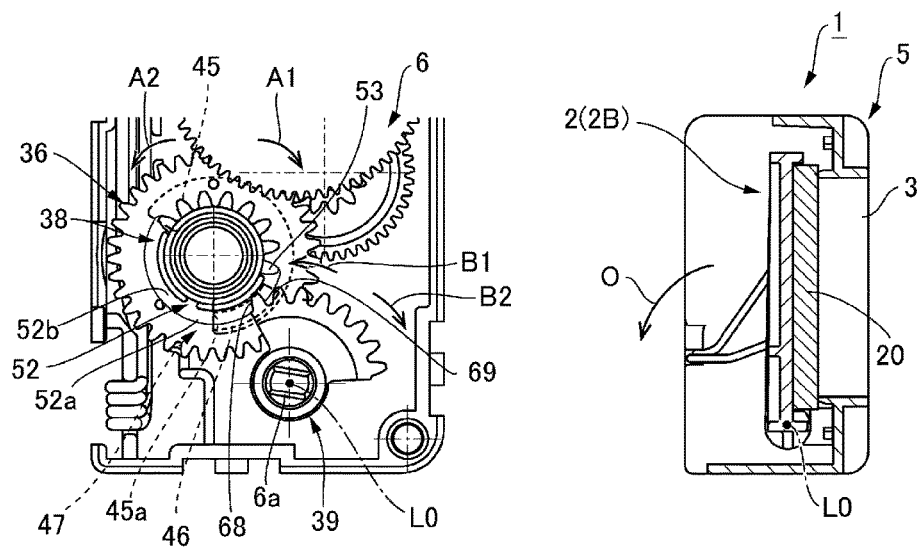

FIGS. 7A and 7B are explanatory views showing opening and closing operations for the opening part 3 by the damper device 1. A left side view in FIG. 7A is a partly plan view showing the baffle drive mechanism 6 in a state that the partially toothless gear 38 and the sector gear 39 are engaged with each other when the baffle 2 is located at the open position 2A. A right side view in FIG. 7A is a cross-sectional view showing the frame 5 and the baffle 2 when the baffle 2 is located at the open position 2A. A left side view in FIG. 7B is a partly plan view showing the baffle drive mechanism 6 in a state that the partially toothless gear 38 and the sector gear 39 are engaged with each other when the baffle 2 is located at the closed position 2B. A right side view in FIG. 7B is a cross-sectional view showing the frame 5 and the baffle 2 when the baffle 2 is located at the closed position 2B.

In a state that the opening part 3 is opened, as shown in FIG. 1A and FIG. 7A, the baffle 2 is located at the open position 2A. The drive gear 36 is stopped at a restricted position where its further turning in the first turning direction "A1" (turning direction for opening the baffle 2) is restricted by the turning angle range restriction mechanism 47. In other words, the circular arc shaped protruded part 46 of the case 8 is abutted with the other inner peripheral end face 45b of the circular arc groove 45 of the drive gear 36 to restrict turning in the first turning direction "A1" of the drive gear 36. The teeth part 51 of the partially toothless gear 38 is engaged with two teeth 72 of a plurality of the teeth of the sector gear 39 which are disposed at an end portion on the opposite side to the first tooth 68 in the circumferential direction.

When the opening part 3 is to be closed, the damper device 1 drives the motor 31 by a predetermined number of steps in a predetermined turning direction in a state shown in FIG. 7A. As a result, the drive gear 36 is turned in the second turning direction "A2". Therefore, the sector gear 39 is turned in the second turning direction "B2". When the sector gear 39 is turned in the second turning direction "B2", the baffle 2 connected with the output shaft 6a of the sector gear 39 is turned in a closing direction "C" from the open position 2A toward the closed position 2B.

When the motor 31 is driven by a predetermined number of steps, as shown in FIG. 7B, the drive gear 36 is stopped at a restricted position where its turning in the second turning direction "A2" (turning direction for closing by the baffle 2) is restricted by the turning angle range restriction mechanism 47. In other words, the circular arc shaped protruded part 46 of the case 8 is abutted with the inner peripheral end face 45a of the circular arc groove 45 of the drive gear 36 to restrict further turning in the second turning direction "A2" of the drive gear 36. In this state, the first tooth 68 of the sector gear 39 is entered to the inner peripheral side of the tooth tip circle 51a on one side "X1" in the "X" direction of the end face 52b of the circular arc-shaped outer peripheral part 52 of the partially toothless gear 38. Further, the second tooth 69 of the sector gear 39 is abutted with the outer peripheral face 52a of the circular arc-shaped outer peripheral part 52. The baffle 2 is located at the closed position 2B and the elastic member 20 is abutted with the seal plate part 14 of the frame 5 and is elastically deformed. Therefore, the opening part 3 is surely closed by the baffle 2.

The predetermined number of steps by which the motor 31 is driven is set to be a value that a plurality of steps is added to a specified number of steps for reaching the baffle 2 located at the open position 2A to the closed position 2B. Therefore, after the baffle 2 is reached to the closed position 2B, the motor 31 is further driven by a plurality of steps. As a result, the baffle 2 is further pressed in a direction approaching to the seal plate part 14 from the closed position 2B and the elastic member 20 is further deformed. Therefore, closing of the opening part 3 is further secured. In this embodiment, after the baffle 2 is reached to the closed position 2B, when the motor 31 is further driven by a plurality of steps, step-out is occurred in the motor 31 and thus flapping of the baffle 2 may be easily occurred due to the step-out. However, according to this embodiment, in a state that the baffle 2 is located at the closed position 2B, the second tooth 69 of the sector gear 39 is abutted with the outer peripheral face 52a of the circular arc-shaped outer peripheral part 52 and the sector gear 39 is prevented from turning in the first turning direction "B1" in which the baffle 2 is opened. Therefore, flapping of the baffle 2 due to the step-out occurred in the motor 31 can be restrained.

Shape restoring force of the elastic member 20 which is elastically deformed by the baffle 2 reached to the closed position 2B acts as force for turning the sector gear 39 in a direction for opening the baffle 2. In other words, the shape restoring force of the elastic member 20 acts on the sector gear 39 as force for turning in the first turning direction "B1". However, according to this embodiment, in a state that the baffle 2 is located at the closed position 2B, the second tooth 69 of the sector gear 39 is abutted with the outer peripheral face 52a of the circular arc-shaped outer peripheral part 52 and thereby the sector gear 39 is prevented from turning in the first turning direction "B1" for opening the baffle 2. Therefore, in the damper device 1 in this embodiment, the baffle 2 is not moved from the closed position 2B in a direction for opening the opening part 3 due to the shape restoring force of the elastic member 20. In addition, the sector gear 39 is prevented from turning in the first turning direction in which the baffle 2 is moved for opening and thus the baffle 2 located at the closed position 2B is restrained from being flapped due to fluid pressure.

Next, when the opening part 3 is to be opened, the damper device 1 drives the motor 31 by a predetermined number of steps in a turning direction which is opposite to that for closing the opening part 3. The predetermined number of steps is that for making the baffle 2 located at the closed position 2B reach to the open position 2A. Therefore, the drive gear 36 is turned in the first turning direction "A1".

When the drive gear 36 starts to turn, the first tooth 53 (tooth at a front end in the first turning direction "A1") located on the most circular arc-shaped outer peripheral part 52 side of the partially toothless gear 38 is passed through the second tooth 69 of the sector gear 39 and engaged between the first tooth 68 and the second tooth 69. As a result, the sector gear 39 starts turning in the first turning direction "B1". When the sector gear 39 is turned in the first turning direction "B1", the baffle 2 connected with the output shaft 6a of the sector gear 39 is turned in the open direction "O" toward the open position 2A from the closed position 2B.

Figure 8A:
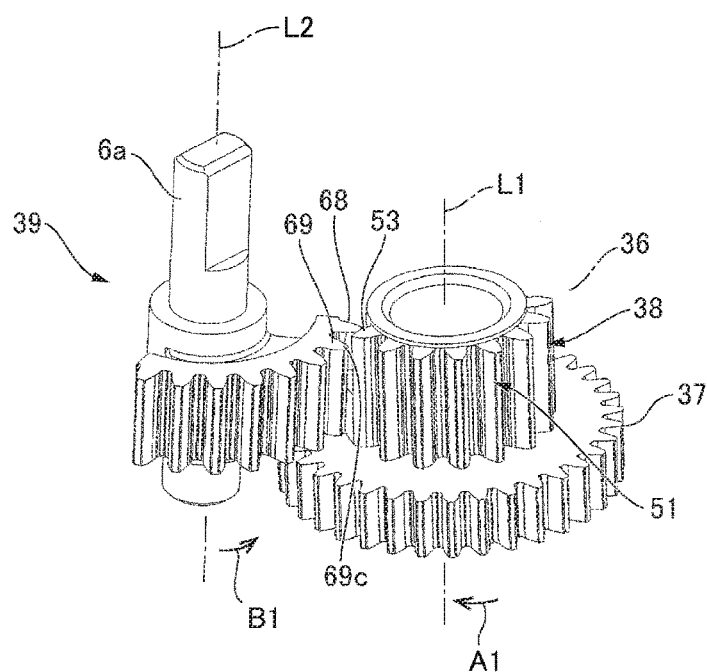
FIGS. 8A and 8B are explanatory views showing a state that a sector gear and a partially toothless gear in conventional shapes start to engage with each other.
Figure 8B:
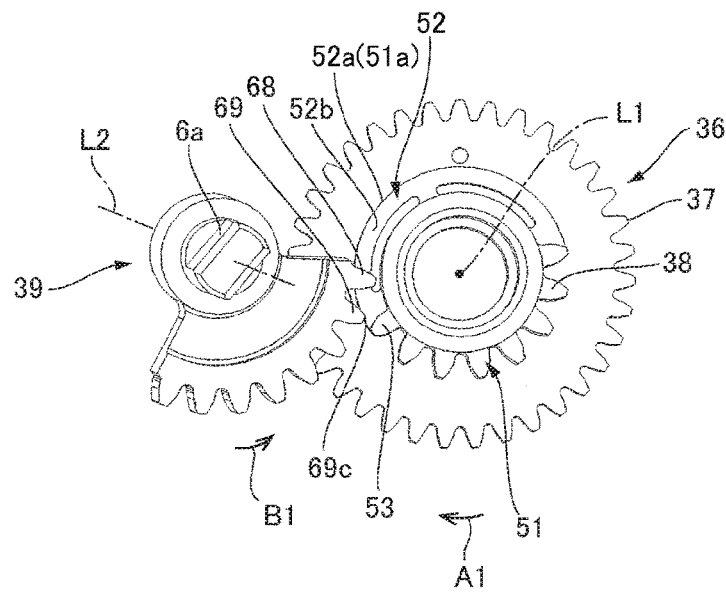

In this embodiment, for example, the turning center axial line of the sector gear 39 may be inclined due to force acted on the sector gear 39 from the baffle 2, component tolerances and the like. In this case, if the outer peripheral face 52a of the circular arc-shaped outer peripheral part 52 is provided so as to have the same diameter as that of the tooth tip circle 51a of the teeth part 51 and concentric with the tooth tip circle 51a, as shown in FIGS. 8A and 8B, an end 69c on one side "X1" in the "X" direction of the second tooth 69 in an abutted state with the outer peripheral face 52a of the circular arc-shaped outer peripheral part 52 may be entered to an inner peripheral side of the tooth tip circle 51a of the partially toothless gear 38 on one side "X1" in the "X" direction of the end face 52b of the circular arc-shaped outer peripheral part 52. If the end 69c of the second tooth 69 is entered to the inner peripheral side of the tooth tip circle 51a, when the first tooth 53 of the partially toothless gear 38 located on the most circular arc-shaped outer peripheral part 52 is going to pass through the second tooth 69 of the sector gear 39, the first tooth 53 and the second tooth 69 are interfered with each other to generate abnormal noise.

On the other hand, in this embodiment, the outer peripheral face 52a of the circular arc-shaped outer peripheral part 52 of the partially toothless gear 38 is located on an outer peripheral side relative to the tooth tip circle 51a of the teeth part 51 of the partially toothless gear 38. Therefore, in a case that the turning center axial line "L2" of the sector gear 39 is inclined, when the second tooth 69 of the sector gear 39 and the circular arc-shaped outer peripheral part 52 are abutted with each other, an abutting position of the second tooth 69 with the circular arc-shaped outer peripheral part 52 is located to an outer peripheral side of the tooth tip circle 51a. As a result, even if it the turning center axial line "L2" of the sector gear 39 is inclined, the end 69c on one side "X1" in the "X" direction of the second tooth 69 is prevented from entering to the inner peripheral side of the tooth tip circle 51a of the partially toothless gear 38 on one side "X1" in the "X" direction of the end face 52b of the circular arc-shaped outer peripheral part 52. Therefore, when the partially toothless gear 38 and the sector gear 39 start to engage with each other, the first tooth 53 of the partially toothless gear 38 and the second tooth 69 of the sector gear 39 are prevented from being interfered with each other and from generating abnormal noise.

In this embodiment, in the partially toothless gear 38, the outer peripheral face 52a of the circular arc-shaped outer peripheral part 52 and the first tooth face 53a of the first tooth 53 of the teeth part 51 are continuously connected with each other through the curved face "R" without a step. Therefore, when the second tooth 69 of the sector gear 39 contacted with the first tooth face 53a of the first tooth 53 of the partially toothless gear 38 is to be contacted with the outer peripheral face 52a of the circular arc-shaped outer peripheral part 52 or, when the second tooth 69 of the sector gear 39 contacted with the outer peripheral face 52a of the circular arc-shaped outer peripheral part 52 is to be contacted with the first tooth face 53a of the first tooth 53 of the partially toothless gear 38, the second tooth 69 does not collide with a step or the like and thus abnormal noise can be prevented or restrained from being generated.

(Other Embodiments)

In the embodiment described above, the outer peripheral face 52a of the circular arc-shaped outer peripheral part 52 is a circular arc face having a constant diameter. However, the outer peripheral face 52a of the circular arc-shaped outer peripheral part 52 may be arranged to an outer peripheral side of the tooth tip circle 51a only in a region where the second tooth 69 of the sector gear 39 is capable of abutting.

Further, it may be structured that, when the baffle 2 is located at the open position 2A, a tooth located at an end on an opposite side to the first tooth 68 in a circumferential direction of the sector gear 39 is entered to an inner peripheral side of the tooth tip circle 51a of the partially toothless gear 38 and its adjacent tooth is abutted with the outer peripheral face 52a of the circular arc-shaped outer peripheral part 52. In other words, in a plurality of the teeth of the sector gear 39, teeth structured to correspond to the first tooth 68 and the second tooth 69 may be provided at an end portion on an opposite side in a circumferential direction to the first tooth 68 and the second tooth 69. According to this structure, when the baffle 2 is located at the open position 2A, the sector gear 39 is prevented from turning in the second turning direction "B2" for closing by the baffle 2.

In the embodiment described above, in a plurality of the teeth arranged in a circumferential direction of the sector gear 39, one tooth located at a front end in the first turning direction "B1" (turning direction for moving the baffle to open) is cut out in its portion facing the outer peripheral face 52a of the circular arc-shaped outer peripheral part 52 of the partially toothless gear 38. However, a plurality of teeth may be cut out in their portions facing the outer peripheral face 52a of the circular arc-shaped outer peripheral part 52 of the partially toothless gear 38 to shorten their tooth widths.

In the embodiment described above, the sector gear 39 is formed of a resin molded product integrally provided with the output shaft 6a. However, the sector gear 39 may be structured of a member provided with the output shaft 6a and a member provided with the shaft part 61, the column part 62, the circular arc part 65 and the connecting part 66, and the two members are assembled and integrated to structure the sector gear 39.

At least an embodiment of the present invention may be applied to a damper device structured to move two baffles for opening and closing by one geared motor 10. For example, at least an embodiment of the present invention may be applied to a damper device in which a sector gear 39 is provided with a drive shaft extended on an opposite side to the output shaft 6a in the axial line "L2" direction and a second output shaft which is coaxially disposed with the drive shaft and is driven and turned by the drive shaft over a predetermined turning angle range, and a second baffle is connected with the second output shaft.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A damper device comprising;
a baffle configured to open and close an opening part;
a motor; and
a gear train structured to transmit rotation of the motor to the baffle, the gear train comprising a partially toothless gear and a sector gear configured to engage with the partially toothless gear and driven by the partially toothless gear;
wherein the partially toothless gear comprises an outer peripheral part at a portion adjacent to a teeth part in a circumferential direction so as to have an outer peripheral face curved along a tooth tip circle of the teeth part on an outer peripheral side relative to the tooth tip circle;
wherein the outer peripheral part comprises an end face directed to one side in an axial line direction at a midway position of the teeth part in the axial line direction where a length in the axial line direction is shorter than a tooth width of the teeth part;
wherein the sector gear comprises;
a first tooth which is cut out at a portion facing the outer peripheral face and is configured to enter to an inner peripheral side of the tooth tip circle on one side in the axial line direction of the end face; and
a second tooth which is disposed so as to be adjacent to the first tooth and is configured to abut with the outer peripheral face when the first tooth is entered to the inner peripheral side of the tooth tip circle.

2. The damper device according to claim 1, wherein the outer peripheral face of the outer peripheral part is continuously connected with a first tooth face located on an opposite side to the outer peripheral part of a tooth on the most outer peripheral part side of the teeth part without a step through a curved face.

3. The damper device according to claim 1, wherein
the sector gear comprises an output shaft which is coaxially protruded to one side or the other side in the axial line direction, and
the baffle is connected with the output shaft.

4. The damper device according to claim 3, wherein
when the baffle is located at a closed position where the opening part is closed,
the first tooth is entered to the inner peripheral side of the tooth tip circle on one side in the axial line direction of the end face of the outer peripheral part, and
the second tooth is abutted with the outer peripheral face to prevent the sector gear from turning in an opening direction of the baffle.

5. The damper device according to claim 4, further comprising a frame comprising the opening part,
wherein the baffle comprises an elastic member which is configured to close the opening part, and
wherein the elastic member is abutted with an opening edge of the opening part of the frame and is elastically deformed when the baffle is located at the closed position.

6. The damper device according to claim 1, wherein when the first tooth is entered to the inner peripheral side of the tooth tip circle, the second tooth is abutted with the outer peripheral face at a position on an outer peripheral side relative to the tooth tip circle.

7. The damper device according to claim 6, wherein
the partially toothless gear is integrally provided with a large diameter gear to which rotation of the motor is transmitted on one side in the axial line direction of the large diameter gear,
the sector gear comprises an output shaft which is coaxially protruded to one side or the other side in the axial line direction,
the baffle is connected with the output shaft,
when the baffle is located at the closed position where the opening part is closed, the first tooth is entered to the inner peripheral side of the tooth tip circle on one side in the axial line direction of the end face of the outer peripheral part, the second tooth is abutted with the outer peripheral face at a position on an outer peripheral side relative to the tooth tip circle, and the sector gear is prevented from turning in a direction for opening the baffle.

8. The damper device according to claim 7, further comprising a frame comprising the opening part,
wherein the baffle comprises an elastic member which is configured to close the opening part, and
wherein the baffle is stopped at the closed position in a state that the elastic member is abutted with an opening edge of the opening part of the frame and is elastically deformed.

9. The damper device according to claim 8, further comprising a case which accommodates the motor and the gear train structured to transmit rotation of the motor to the baffle,
wherein the sector gear comprises:
a shaft part;
the output shaft;
a column part provided between the shaft part and the output shaft; and
a circular arc part comprising a plurality of teeth including the first tooth and the second tooth along its outer peripheral face on an outer peripheral side of the column part;
wherein the case comprises a tube part into which the shaft part is inserted for turnably supporting the sector gear, and
wherein the output shaft is connected with the baffle and the shaft part is inserted into the tube part and thereby the sector gear is held turnably.

10. The damper device according to claim 8, wherein
the baffle comprises:
an opening and closing plate comprising a flat plate part which is larger than the opening part; and
the elastic member which is stuck on a face on an opening part side of the flat plate part;
when the baffle is located at the closed position where the opening part is closed, the sector gear is prevented from turning in an opening direction of the baffle by the second tooth abutted with the outer peripheral face against shape restoring force of the elastic member which is elastically deformed.

11. The damper device according to claim 6, wherein the outer peripheral face of the outer peripheral part is continuously connected with a first tooth face located on an opposite side to the outer peripheral part of a tooth on the most outer peripheral part side of the teeth part without a step through a curved face.

12. The damper device according to claim 11, wherein
the partially toothless gear is integrally provided with a large diameter gear to which rotation of the motor is transmitted on one side in the axial line direction of the large diameter gear,
the sector gear comprises an output shaft which is coaxially protruded to one side or the other side in the axial line direction,
the baffle is connected with the output shaft,
when the baffle is located at the closed position where the baffle closes the opening part, the first tooth is entered to the inner peripheral side of the tooth tip circle on one side in the axial line direction of the end face of the outer peripheral part, the second tooth is abutted with the outer peripheral face at a position on an outer peripheral side relative to the tooth tip circle, and the sector gear is prevented from turning in a direction for opening the baffle.

13. The damper device according to claim 12, further comprising a case which accommodates the motor and the gear train structured to transmit rotation of the motor to the baffle,
wherein the sector gear comprises:
a shaft part;
the output shaft;
a column part provided between the shaft part and the output shaft; and
a circular arc part comprising a plurality of teeth including the first tooth and the second tooth along its outer peripheral face on an outer peripheral side of the column part;
wherein the case comprises a tube part into which the shaft part is inserted for turnably supporting the sector gear, and
wherein the output shaft is connected with the baffle and the shaft part is inserted into the tube part and thereby the sector gear is held turnably.

* * * * *